US010013848B2

(12) United States Patent
Chun

(10) Patent No.: US 10,013,848 B2
(45) Date of Patent: Jul. 3, 2018

(54) SYSTEM AND METHOD FOR PROVIDING REMOTE WAGERING GAMES IN A LIVE TABLE GAME SYSTEM

(71) Applicant: IGT, Las Vegas, NV (US)

(72) Inventor: Jay Chun, Hong Kong (HK)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 15/584,588

(22) Filed: May 2, 2017

(65) Prior Publication Data

US 2017/0236369 A1 Aug. 17, 2017

Related U.S. Application Data

(63) Continuation of application No. 15/205,842, filed on Jul. 8, 2016, now Pat. No. 9,659,433, which is a continuation of application No. 14/043,184, filed on Oct. 1, 2013, now Pat. No. 9,390,592.

(60) Provisional application No. 61/708,865, filed on Oct. 2, 2012.

(51) Int. Cl.
*A63F 13/00* (2014.01)
*G07F 17/32* (2006.01)
*G07F 17/34* (2006.01)

(52) U.S. Cl.
CPC ........ *G07F 17/3223* (2013.01); *G07F 17/322* (2013.01); *G07F 17/3213* (2013.01); *G07F 17/3244* (2013.01); *G07F 17/3293* (2013.01); *G07F 17/34* (2013.01)

(58) Field of Classification Search
CPC ............. G07F 17/3223; G07F 17/3213; G07F 17/322; G07F 17/3244; G07F 17/3293; G07F 17/34
USPC ........................................................... 463/11
See application file for complete search history.

(56) References Cited

U.S. PATENT DOCUMENTS

| | | | |
|---|---|---|---|
| 3,708,219 | A | 1/1973 | Forlini et al. |
| 3,998,309 | A | 12/1976 | Mandas et al. |
| 4,095,795 | A | 6/1978 | Saxton |
| 4,333,715 | A | 6/1982 | Brooks |
| 4,337,945 | A | 7/1982 | Levy |
| 4,448,419 | A | 5/1984 | Telnaes |
| 4,467,424 | A | 8/1984 | Hedges et al. |
| 4,517,558 | A | 5/1985 | Davids |
| 4,607,844 | A | 8/1986 | Fullerton |
| 4,621,814 | A | 11/1986 | Stepan et al. |
| 4,659,182 | A | 4/1987 | Aizawa |
| 4,662,635 | A | 5/1987 | Enokian |
| 4,718,672 | A | 1/1988 | Okada |
| 4,805,907 | A | 2/1989 | Hagiwara |
| 4,856,787 | A | 8/1989 | Itkis |
| 4,858,932 | A | 8/1989 | Keane |

(Continued)

FOREIGN PATENT DOCUMENTS

| | | |
|---|---|---|
| EP | 0478412 | 4/1992 |
| GB | 2403429 | 7/2006 |

(Continued)

*Primary Examiner* — Allen Chan
(74) *Attorney, Agent, or Firm* — Neal, Gerber & Eisenberg LLP

(57) ABSTRACT

Systems and methods for conducting multiple remote wagering games in a live table game system or similar system wherein the gaming symbols which are randomly generated as a result of a live table game are used to resolve the live table game and simulate play and resolve wagering outcomes of one or more remote wagering games which differ from the live table game.

32 Claims, 2 Drawing Sheets

(56) References Cited

U.S. PATENT DOCUMENTS

| | | | |
|---|---|---|---|
| 4,911,449 | A | 3/1990 | Dickinson et al. |
| 4,912,548 | A | 3/1990 | Shanker et al. |
| 5,086,354 | A | 2/1992 | Bass et al. |
| 5,113,272 | A | 5/1992 | Reamey |
| 5,132,839 | A | 7/1992 | Travis |
| 5,248,142 | A | 9/1993 | Breeding |
| 5,288,081 | A | 2/1994 | Breeding |
| 5,319,491 | A | 6/1994 | Selbrede |
| 5,325,830 | A | 7/1994 | Hammer |
| 5,342,047 | A | 8/1994 | Heidel et al. |
| 5,364,100 | A | 11/1994 | Ludlow et al. |
| 5,376,587 | A | 12/1994 | Buchmann et al. |
| 5,393,061 | A | 2/1995 | Manship et al. |
| 5,456,465 | A | 10/1995 | Durham |
| 5,467,893 | A | 11/1995 | Landis et al. |
| 5,472,194 | A | 12/1995 | Breeding et al. |
| 5,490,670 | A | 2/1996 | Hobert |
| 5,494,296 | A | 2/1996 | Grassa |
| 5,539,547 | A | 7/1996 | Ishii et al. |
| 5,544,892 | A | 8/1996 | Breeding |
| 5,580,055 | A | 12/1996 | Hagiwara |
| 5,580,310 | A | 12/1996 | Orus et al. |
| 5,585,821 | A | 12/1996 | Ishikura et al. |
| 5,586,937 | A | 12/1996 | Menashe |
| 5,588,650 | A | 12/1996 | Eman et al. |
| 5,589,980 | A | 12/1996 | Bass et al. |
| 5,611,730 | A | 3/1997 | Weiss |
| 5,613,909 | A | 3/1997 | Stelovsky |
| 5,618,232 | A | 4/1997 | Martin |
| 5,643,086 | A | 7/1997 | Alcorn et al. |
| 5,655,961 | A | 8/1997 | Acres et al. |
| 5,722,890 | A | 3/1998 | Libby et al. |
| 5,743,523 | A | 4/1998 | Kelly et al. |
| 5,743,798 | A | 4/1998 | Adams et al. |
| 5,745,197 | A | 4/1998 | Leung et al. |
| 5,752,881 | A | 5/1998 | Inoue |
| 5,752,882 | A | 5/1998 | Acres et al. |
| 5,759,103 | A | 6/1998 | Freels et al. |
| 5,762,552 | A | 6/1998 | Vuong et al. |
| 5,764,317 | A | 6/1998 | Sadovnik et al. |
| 5,766,076 | A | 6/1998 | Pease et al. |
| 5,772,509 | A | 6/1998 | Weiss |
| RE35,864 | E | 7/1998 | Weingardt |
| 5,782,692 | A | 7/1998 | Stelovsky |
| 5,788,574 | A | 8/1998 | Ornstein et al. |
| 5,791,992 | A | 8/1998 | Crump et al. |
| 5,795,225 | A | 8/1998 | Jones et al. |
| 5,797,795 | A | 8/1998 | Takemoto et al. |
| 5,800,268 | A | 9/1998 | Molnick |
| 5,803,451 | A | 9/1998 | Kelly et al. |
| 5,820,459 | A | 10/1998 | Acres et al. |
| 5,820,461 | A | 10/1998 | Pernatozzi |
| 5,830,067 | A | 11/1998 | Graves et al. |
| 5,836,817 | A | 11/1998 | Acres et al. |
| 5,839,730 | A | 11/1998 | Pike |
| 5,839,731 | A | 11/1998 | Feola |
| 5,851,149 | A | 12/1998 | Xidos et al. |
| 5,873,781 | A | 2/1999 | Keane |
| 5,885,085 | A | 3/1999 | Fujita |
| 5,888,136 | A | 3/1999 | Herbert |
| 5,910,046 | A | 6/1999 | Wada et al. |
| 5,911,626 | A | 6/1999 | McCrea, Jr. |
| 5,931,471 | A | 8/1999 | Bonito |
| 5,951,397 | A | 9/1999 | Dickinson |
| 5,956,180 | A | 9/1999 | Bass et al. |
| 5,967,893 | A | 10/1999 | Lawrence et al. |
| 6,001,016 | A | 12/1999 | Walker et al. |
| 6,015,346 | A | 1/2000 | Bennett |
| 6,019,374 | A | 2/2000 | Breeding |
| 6,027,115 | A | 2/2000 | Griswold et al. |
| 6,039,650 | A | 3/2000 | Hill |
| 6,050,895 | A | 4/2000 | Luciano et al. |
| 6,054,969 | A | 4/2000 | Haisma |
| 6,056,641 | A | 5/2000 | Webb |
| 6,059,658 | A | 5/2000 | Mangano et al. |
| 6,080,063 | A | 6/2000 | Khosla |
| 6,083,105 | A | 7/2000 | Ronin et al. |
| 6,113,493 | A | 9/2000 | Walker et al. |
| 6,135,884 | A | 10/2000 | Hedrick et al. |
| 6,142,876 | A | 11/2000 | Cumbers |
| 6,149,522 | A | 11/2000 | Alcorn et al. |
| 6,159,098 | A | 12/2000 | Slomiany et al. |
| 6,165,069 | A | 12/2000 | Sines et al. |
| 6,213,875 | B1 | 4/2001 | Suzuki |
| 6,244,596 | B1 | 6/2001 | Kondratjuk |
| 6,251,014 | B1 | 6/2001 | Stockdale et al. |
| 6,252,707 | B1 | 6/2001 | Kleinberger et al. |
| 6,254,481 | B1 | 7/2001 | Jaffe |
| 6,264,561 | B1 | 7/2001 | Saffari |
| 6,312,334 | B1 | 11/2001 | Yoseloff |
| 6,315,666 | B1 | 11/2001 | Mastera et al. |
| 6,336,857 | B1 | 1/2002 | McBride |
| 6,337,513 | B1 | 1/2002 | Clevenger et al. |
| 6,347,996 | B1 | 2/2002 | Gilmore et al. |
| 6,368,216 | B1 | 4/2002 | Hedrick et al. |
| 6,379,244 | B1 | 4/2002 | Sagawa et al. |
| 6,394,907 | B1 | 5/2002 | Rowe |
| 6,398,220 | B1 | 6/2002 | Inoue |
| 6,416,827 | B1 | 7/2002 | Chakrapani et al. |
| 6,435,970 | B1 | 8/2002 | Baerlocher et al. |
| 6,444,496 | B1 | 9/2002 | Edwards et al. |
| 6,445,185 | B1 | 9/2002 | Damadian et al. |
| 6,491,583 | B1 | 12/2002 | Gauselmann |
| 6,503,147 | B1 | 1/2003 | Stockdale et al. |
| 6,508,709 | B1 | 1/2003 | Karmarkar |
| 6,511,375 | B1 | 1/2003 | Kaminkow |
| 6,512,559 | B1 | 1/2003 | Hashimoto et al. |
| 6,514,141 | B1 | 2/2003 | Kaminkow et al. |
| 6,517,073 | B1 | 2/2003 | Vancura |
| 6,517,433 | B2 | 2/2003 | Loose et al. |
| 6,517,437 | B1 | 2/2003 | Wells et al. |
| 6,547,664 | B2 | 4/2003 | Saunders |
| 6,575,541 | B1 | 6/2003 | Hedrick et al. |
| 6,575,834 | B1 | 6/2003 | Lindo |
| 6,585,591 | B1 | 7/2003 | Baerlocher et al. |
| 6,607,195 | B2 | 8/2003 | Vancura |
| D480,961 | S | 10/2003 | Deadman |
| 6,646,695 | B1 | 11/2003 | Gauselmann |
| 6,652,378 | B2 | 11/2003 | Cannon et al. |
| 6,659,864 | B2 | 12/2003 | McGahn et al. |
| 6,661,425 | B1 | 12/2003 | Hiroaki |
| 6,676,517 | B2 | 1/2004 | Beavers |
| 6,685,567 | B2 | 2/2004 | Cockerille et al. |
| 6,695,703 | B1 | 2/2004 | McGahn |
| 6,702,675 | B2 | 3/2004 | Poole et al. |
| 6,712,694 | B1 | 3/2004 | Nordman |
| 6,715,756 | B2 | 4/2004 | Inoue |
| 6,717,728 | B2 | 4/2004 | Putilin |
| 6,722,979 | B2 | 4/2004 | Gilmore et al. |
| 6,726,565 | B2 | 4/2004 | Hughs-Baird |
| 6,789,801 | B2 | 9/2004 | Snow |
| 6,802,777 | B2 | 10/2004 | Seelig et al. |
| 6,804,763 | B1 | 10/2004 | Stockdale et al. |
| 6,817,945 | B2 | 11/2004 | Seelig et al. |
| 6,817,946 | B2 | 11/2004 | Motegi et al. |
| 6,863,608 | B1 | 3/2005 | LeMay et al. |
| 6,866,586 | B2 | 3/2005 | Oberberger et al. |
| 6,887,157 | B2 | 5/2005 | LeMay et al. |
| 6,890,259 | B2 | 5/2005 | Breckner et al. |
| 6,906,762 | B1 | 6/2005 | Witehira et al. |
| 6,937,298 | B2 | 8/2005 | Okada |
| 7,029,395 | B1 | 4/2006 | Baerlocher |
| 7,128,647 | B2 | 10/2006 | Muir |
| 7,204,753 | B2 | 4/2007 | Ozaki et al. |
| 7,220,181 | B2 | 5/2007 | Okada |
| 7,252,288 | B2 | 8/2007 | Seelig et al. |
| 7,255,643 | B2 | 8/2007 | Ozaki et al. |
| 7,303,473 | B2 | 12/2007 | Rowe |
| 7,309,284 | B2 | 12/2007 | Griswold et al. |
| 7,322,884 | B2 | 1/2008 | Emori et al. |
| 7,326,115 | B2 | 2/2008 | Baerlocher |
| 7,329,179 | B2 | 2/2008 | Baerlocher |
| 7,329,181 | B2 | 2/2008 | Hoshino et al. |
| 7,351,146 | B2 | 4/2008 | Kaminkow |

(56) References Cited

U.S. PATENT DOCUMENTS 7,387,570 B2 6/2008 Randall
7,452,270 B2 11/2008 Walker et al.
7,465,227 B2 12/2008 Baerlocher
7,470,185 B2 12/2008 Baerlocher
7,488,251 B2 2/2009 Kaminkow
7,503,849 B2 3/2009 Hornik et al.
7,537,456 B2 5/2009 Snow
7,566,274 B2 7/2009 Johnson et al.
7,575,512 B2 8/2009 Kennedy
7,591,726 B2 9/2009 Baerlocher et al.
7,618,319 B2 11/2009 Casey et al.
7,666,086 B2 2/2010 Baerlocher
7,666,087 B2 2/2010 Hughs-Baird
7,699,698 B2 4/2010 Randall
7,753,798 B2 7/2010 Soltys et al.
7,758,419 B2 7/2010 Rowe et al.
7,775,524 B2 8/2010 Lutnick et al.
7,789,743 B2 9/2010 Walker et al.
7,819,744 B2 10/2010 Hughs-Baird
7,822,641 B2 10/2010 Abbott et al.
7,828,643 B2 11/2010 Baerlocher
7,837,547 B2 11/2010 Cannon
7,846,018 B2 12/2010 Baerlocher
7,867,077 B2 1/2011 Baerlocher et al.
7,878,892 B2 2/2011 Sines et al.
7,905,771 B2 3/2011 Walker et al.
7,905,774 B2 3/2011 Walker et al.
7,914,372 B2 3/2011 Tessmer et al.
7,931,531 B2 4/2011 Oberberger
7,950,993 B2 5/2011 Oberberger
7,963,845 B2 6/2011 Baerlocher
7,967,674 B2 6/2011 Baerlocher
7,976,378 B2 7/2011 Baerlocher
7,980,948 B2 7/2011 Rowe et al.
8,020,866 B2 9/2011 Walker et al.
8,066,564 B2 11/2011 Randall
8,087,999 B2 1/2012 Oberberger et al.
8,109,821 B2 2/2012 Kovacs et al.
8,128,491 B2 3/2012 Vasquez et al.
8,128,492 B2 3/2012 Vasquez et al.
8,152,624 B2 4/2012 Gerrard et al.
8,152,629 B2 4/2012 DeWaal et al.
8,167,711 B2 5/2012 Baerlocher
8,172,660 B2 5/2012 Lancaster et al.
8,177,627 B2 5/2012 Baerlocher
8,182,323 B2 5/2012 Okada
8,197,335 B2 6/2012 DeWaal et al.
8,202,153 B2 6/2012 Baerlocher
8,206,212 B2 6/2012 Iddings et al.
8,231,456 B2 7/2012 Zielinski
8,235,801 B2 8/2012 Tan
8,267,765 B2 9/2012 Baerlocher
8,305,550 B2 11/2012 Jung et al.
8,313,373 B2 11/2012 Walker et al.
8,317,589 B2 11/2012 Tessmer et al.
8,342,954 B2 1/2013 Oberberger et al.
8,360,852 B2 1/2013 Randall
8,360,859 B2 1/2013 Walker et al.
8,403,740 B2 3/2013 Kovacs et al.
8,425,305 B2 4/2013 Baerlocher et al.
8,430,735 B2 4/2013 Oberberger
8,430,739 B2 4/2013 Rodgers
8,454,427 B2 6/2013 Baerlocher
8,460,095 B2 6/2013 Tan
8,474,820 B2 7/2013 Walker et al.
8,485,888 B2 7/2013 Baerlocher
8,496,521 B2 7/2013 Randall
8,500,533 B2 8/2013 Lutnick et al.
8,506,380 B2 8/2013 Hughes et al.
8,517,824 B2 8/2013 Zielinski et al.
8,613,650 B2 12/2013 Kovacs et al.
9,135,775 B2 9/2015 Pececnik
9,214,056 B2 12/2015 Kovacs et al.
2001/0013681 A1 8/2001 Bruzzese et al.
2002/0045472 A1 4/2002 Adams
2002/0068635 A1 6/2002 Hill
2002/0077712 A1 6/2002 Safaei et al.
2002/0094869 A1 7/2002 Harkham
2002/0173354 A1 11/2002 Winans et al.
2003/0013510 A1 1/2003 Vuong
2003/0027624 A1 2/2003 Gilmore et al.
2003/0032478 A1 2/2003 Takahama et al.
2003/0032479 A1 2/2003 LeMay et al.
2003/0060271 A1 3/2003 Gilmore et al.
2003/0073497 A1 4/2003 Nelson
2003/0087690 A1 5/2003 Loose et al.
2003/0130028 A1 7/2003 Aida et al.
2003/0176214 A1 9/2003 Burak et al.
2003/0203756 A1 10/2003 Jackson
2003/0224854 A1 12/2003 Joao
2003/0234489 A1 12/2003 Okada
2003/0236114 A1 12/2003 Griswold et al.
2003/0236118 A1 12/2003 Okada
2004/0002379 A1 1/2004 Parrott et al.
2004/0023714 A1 2/2004 Asdale
2004/0029636 A1 2/2004 Wells
2004/0063490 A1 4/2004 Okada
2004/0066475 A1 4/2004 Searle
2004/0070146 A1 4/2004 Snow
2004/0084843 A1 5/2004 Snow
2004/0090003 A1 5/2004 Snow
2004/0090005 A1 5/2004 Snow
2004/0116178 A1 6/2004 Okada
2004/0145116 A1 7/2004 Calvo et al.
2004/0147303 A1 7/2004 Imura et al.
2004/0147314 A1 7/2004 LeMay et al.
2004/0150162 A1 8/2004 Okada
2004/0162146 A1 8/2004 Ooto
2004/0166925 A1 8/2004 Emori et al.
2004/0171423 A1 9/2004 Silva et al.
2004/0183972 A1 9/2004 Bell
2004/0192430 A1 9/2004 Burak et al.
2004/0198485 A1 10/2004 Loose et al.
2004/0207154 A1 10/2004 Okada
2004/0209666 A1 10/2004 Tashiro
2004/0209667 A1 10/2004 Emori et al.
2004/0209668 A1 10/2004 Okada
2004/0209671 A1 10/2004 Okada
2004/0209678 A1 10/2004 Okada
2004/0209683 A1 10/2004 Okada
2004/0214635 A1 10/2004 Okada
2004/0214637 A1 10/2004 Nonaka
2004/0224747 A1 11/2004 Okada
2004/0233663 A1 11/2004 Emslie et al.
2004/0239582 A1 12/2004 Seymour
2005/0003886 A1 1/2005 Englman et al.
2005/0032571 A1 2/2005 Asonuma
2005/0037843 A1 2/2005 Wells et al.
2005/0049032 A1 3/2005 Kobayashi
2005/0049046 A1 3/2005 Kobayashi
2005/0062410 A1 3/2005 Bell et al.
2005/0063055 A1 3/2005 Engel
2005/0079913 A1 4/2005 Inamura
2005/0085292 A1 4/2005 Inamura
2005/0153772 A1 7/2005 Griswold et al.
2005/0153775 A1 7/2005 Griswold et al.
2005/0176493 A1 8/2005 Nozaki et al.
2005/0176507 A1 8/2005 Ephrati et al.
2005/0192090 A1 9/2005 Muir et al.
2005/0192099 A1 9/2005 Nguyen et al.
2005/0206582 A1 9/2005 Bell et al.
2005/0208994 A1 9/2005 Berman
2005/0233799 A1 10/2005 LeMay et al.
2005/0233803 A1 10/2005 Yang
2005/0239539 A1 10/2005 Inamura
2005/0266912 A1 12/2005 Sekiguchi
2005/0282625 A1 12/2005 Nicely
2005/0285337 A1 12/2005 Durham et al.
2006/0030399 A1 2/2006 Baerlocher
2006/0040733 A1 2/2006 Baerlocher
2006/0073882 A1 4/2006 Rozkin et al.
2006/0092170 A1 5/2006 Bathiche et al.
2006/0100014 A1 5/2006 Griswold et al.
2006/0103951 A1 5/2006 Bell et al.

(56) References Cited

U.S. PATENT DOCUMENTS

| | | | |
|---|---|---|---|
| 2006/0125745 | A1 | 6/2006 | Evanicky |
| 2006/0135240 | A1 | 6/2006 | Barshack |
| 2006/0166727 | A1 | 7/2006 | Burak |
| 2006/0189382 | A1 | 8/2006 | Muir et al. |
| 2006/0191177 | A1 | 8/2006 | Engel |
| 2006/0258446 | A1 | 11/2006 | Nguyen et al. |
| 2006/0284574 | A1 | 12/2006 | Emslie et al. |
| 2006/0290594 | A1 | 12/2006 | Engel et al. |
| 2007/0004510 | A1 | 1/2007 | Underdahl et al. |
| 2007/0010315 | A1 | 1/2007 | Hein |
| 2007/0015583 | A1 | 1/2007 | Tran |
| 2007/0021198 | A1 | 1/2007 | Muir et al. |
| 2007/0129123 | A1 | 6/2007 | Eryou et al. |
| 2008/0020816 | A1 | 1/2008 | Griswold et al. |
| 2008/0020839 | A1 | 1/2008 | Wells et al. |
| 2008/0020840 | A1 | 1/2008 | Wells et al. |
| 2008/0020841 | A1 | 1/2008 | Wells et al. |
| 2008/0064467 | A1 | 3/2008 | Reiner |
| 2008/0146344 | A1 | 6/2008 | Rowe et al. |
| 2008/0149705 | A1 | 6/2008 | Giobbi et al. |
| 2008/0182650 | A1 | 7/2008 | Randall et al. |
| 2008/0231611 | A1 | 9/2008 | Bathiche et al. |
| 2008/0248865 | A1 | 10/2008 | Tedesco et al. |
| 2008/0305855 | A1 | 12/2008 | Czyzewski et al. |
| 2008/0318668 | A1 | 12/2008 | Ching et al. |
| 2009/0029766 | A1 | 1/2009 | Lutnick et al. |
| 2009/0111573 | A1 | 4/2009 | Iddings |
| 2010/0111820 | A1 | 5/2010 | Natura et al. |
| 2010/0120506 | A1 | 5/2010 | Davis et al. |
| 2010/0130280 | A1 | 5/2010 | Arezina et al. |
| 2010/0234086 | A1 | 9/2010 | Michaelson |
| 2011/0111824 | A1 | 5/2011 | Cuddy et al. |
| 2012/0252564 | A1 | 10/2012 | Moore |

FOREIGN PATENT DOCUMENTS

| | | |
|---|---|---|
| WO | WO 99/19027 | 4/1999 |
| WO | WO 99/42889 | 8/1999 |
| WO | WO 99/44095 | 9/1999 |
| WO | WO 01/09664 | 2/2001 |
| WO | WO 01/15127 | 3/2001 |
| WO | WO 01/15128 | 3/2001 |
| WO | WO 01/15132 | 3/2001 |
| WO | WO 2004/001486 | 12/2003 |
| WO | WO 2004/102520 | 11/2004 |
| WO | WO 2006/034192 | 3/2006 |
| WO | WO 2006/038819 | 4/2006 |
| WO | WO 2007/032945 | 3/2007 |
| WO | WO 2007/073534 | 6/2007 |

SYSTEM AND METHOD FOR PROVIDING REMOTE WAGERING GAMES IN A LIVE TABLE GAME SYSTEM

PRIORITY CLAIM

This application is a continuation of, claims priority to and the benefit of U.S. patent application Ser. No. 15/205,842, filed on Jul. 8, 2016, which is a continuation of, claims priority to and the benefit of U.S. patent application Ser. No. 14/043,184, filed on Oct. 1, 2013, now U.S. Pat. No. 9,390,592, which claims priority to and the benefit of U.S. Provisional Patent Application No. 61/708,865, filed on Oct. 2, 2012, the entire contents of each are incorporated by reference herein.

CROSS REFERENCE TO RELATED APPLICATIONS

This application is related to U.S. patent application Ser. No. 13/042,633, filed on Mar. 8, 2011, which is a continuing application of U.S. patent application Ser. No. 11/497,708, filed on Aug. 1, 2006, and a continuation-in-part of U.S. patent application Ser. No. 11/042,732, filed on Jan. 24, 2005, U.S. patent application Ser. No. 11/198,218, filed on Aug. 5, 2005 and U.S. patent application Ser. No. 11/312,150, filed on Dec. 19, 2005, the entire contents of all applications which are incorporated by this reference.

BACKGROUND

The invention generally relates to systems and methods for providing, conducting and facilitating the play of wagering games.

Wagering games such as baccarat, blackjack, roulette, and various poker-based table games are popular games offered in casinos. These games are generally played on physical gaming tables having felt layouts, or electronic and electro-mechanical gaming machines in which a dealer, playing cards, chips or other gaming elements may be virtual. Each of these platforms have a limited capacity for players to participate in any particular game due to a limited number of player positions or a limitation on physical space about the table.

These limitations have led to the introduction and growing popularity of live table systems with remote gaming terminals that essentially extend the capacity of a live table game to include players in the game. The gaming terminals are therefore configured to facilitate the participation of remotely seated players in a live table game.

While live table systems have increased the capacity for players to participate in live table games, the systems have not increased the wagering game options for players who participate in the live table game. Thus, it can be seen that there is a need in the art for a system and method that, among other things, provides additional wagering game options.

SUMMARY

The invention is generally directed to systems and methods for conducting multiple remote wagering games in a live table game system or similar system wherein the gaming symbols which are randomly generated as a result of a live table game are used to resolve the live table game and to simulate play and resolve wagering outcomes of one or more remote wagering games which differ from the live table game in game rules, pay tables, wager size and/or limitations on minimum and maximum wagers, side bets, progressive prizes, bonus prize, and the like.

Some embodiments of the invention are directed to a method for conducting multiple wagering games in a live-table game system including remote gaming terminals, one or more data communication devices, one or more processors, and one or more data storage devices, the method comprising the steps of: communicating data relating to a live table game available for play, the live table game being associated with one or more wagers, wherein the outcome of the one or more wagers is determinable by comparing a first criteria with a plurality of gaming symbols randomly generated as a result of playing the live table game according to a first game rules; communicating data relating to one or more remote wagering games available for play, the one or more remote wagering games being associated with one or more wagers and one or more second game rules, wherein the outcome of the one or more wagers is determinable by comparing a second criteria with the same plurality of gaming symbols randomly generated as a result of playing the live table game, and wherein one or both of the second criteria and the second game rules differ from the first criteria and first game rules; receiving data relating to one or more wagers placed in connection with a remote wagering game selected from the one or more remote wagering games available for play; receiving the plurality of gaming symbols randomly generated as a result of the play of the live table game; simulating play of the remote wagering game, wherein play is simulated according to the second game rules and the plurality of gaming symbols received; comparing the plurality of gaming symbols received with the second criteria to determine the outcome of the one or more wagers placed; and resolving the one or more wagers by collecting the wager if the second criteria is not satisfied or awarding a payout if the wager is satisfied.

Some embodiments of the aforementioned method further include the step of determining the one or more remote wagering games to be communicated based on the amount of gaming symbols randomly generated as a result of playing the live table.

In some embodiments of the aforementioned method, the second criteria are the same as the first criteria.

In some embodiments of the aforementioned method, the second game rules are the same as the first game rules.

In some embodiments of the aforementioned method, the second criteria comprises the first criteria and a side wager criteria, the side wager criteria being satisfied upon the plurality of gaming symbols randomly generated including one or more preset gaming symbols.

In some embodiments of the aforementioned method, the second criteria comprises a side wager criteria, the side wager criteria being satisfied upon the plurality of gaming symbols randomly generated including one or more preset gaming symbols.

In some embodiments of the aforementioned method, the plurality of gaming symbols randomly generated as a result of playing the live table game resolve the outcome of any wagers placed in the live table game.

In some embodiments of the aforementioned method, the second game rules and second criteria differ from the first game rules and first criteria.

Some embodiments of the aforementioned method further include the step of awarding a payout amount if any one of the one or more wagers placed is won. In some embodiments, the second game rules differ from the first game rules and provide for a different award than the live table game based on the same plurality of gaming symbols randomly generated.

In some embodiments of the aforementioned method, the gaming terminal further comprises a display device in communication with the one or more communication devices and the steps of communicating data further comprise displaying the data on the display device.

In some embodiments of the aforementioned method, the gaming terminal further comprises a display device in communication with the one or more communication devices and the step of simulating play of the remote table game further comprises displaying the simulated play of the remote table game on the display device.

Some embodiments of the invention are also directed to a system for conducting multiple wagering games comprising a plurality of remote gaming terminals having one or more data communication devices, one or more processors, and one or more data storage devices, wherein the system is configured for: communicating data relating to a live table game available for play to the gaming terminals, the live table game being associated with one or more wagers, wherein the outcome of the one or more wagers is determinable by comparing a first criteria with a plurality of gaming symbols randomly generated as a result of playing the live table game according to a first game rules; communicating data relating to one or more remote wagering games available for play to the gaming terminals, the one or more remote wagering games being associated with one or more wagers and one or more second game rules, wherein the outcome of the one or more wagers is determinable by comparing a second criteria with the same plurality of gaming symbols randomly generated as a result of playing the live table, and wherein one or both of the second criteria and the second game rules differ from the first criteria and first game rules; receiving data from a gaming terminal relating to one or more wagers placed in connection with a remote wagering game selected from the one or more remote wagering games available for play; receiving the plurality of gaming symbols randomly generated as a result of the play of the live table game; simulating play of the remote wagering game, wherein play is simulated according to the second game rules and the plurality of gaming symbols received; comparing the plurality of gaming symbols received with the second criteria to determine the outcome of the one or more wagers placed; and resolving the one or more wagers placed by collecting the wager if the second criteria is not satisfied or awarding a payout if the wager is satisfied.

In some embodiments of the aforementioned system, the gaming terminal further comprises a display device in communication with the one or more communication devices.

In some embodiments the aforementioned system further includes one or more communication devices for collecting game play wherein the one or more processors gaming terminal.

Some embodiments of the invention are directed to another method comprising the steps of: communicating data from a gaming server relating to a live table game available for play, the live table game being associated with one or more wagers, wherein the outcome of the one or more wagers is determinable by comparing a first criteria stored in a games database with a plurality of gaming symbols randomly generated as a result of playing the live table game according to a first game rules stored in the games database; communicating data from the gaming server relating to one or more remote wagering games available for play, the one or more remote wagering games being associated with one or more wagers and one or more second game rules stored in the games database, wherein the outcome of the one or more wagers is determinable by comparing a second criteria stored in the games database with the same plurality of gaming symbols randomly generated as a result of playing the live table game, and wherein one or both of the second criteria and the second game rules differ from the first criteria and first game rules; receiving data from a gaming terminal relating to one or more wagers placed in connection with a remote wagering game selected from the one or more remote wagering games available for play; receiving the plurality of gaming symbols randomly generated as a result of the play of the live table game through a data communication device configured for acquiring game play data from the live table game; simulating play of the remote table game, wherein play is simulated by a processor and displayed on a display device at the gaming terminal according to the second game rules and the plurality of gaming symbols received; and the processor comparing the plurality of gaming symbols received with the second criteria to determine the outcome of the one or more wagers placed and facilitating the collection of the wager if the second criteria is not satisfied or the awarding of a payout if the wager is satisfied.

In some embodiments of the aforementioned method, the second criteria and the first criteria are the same.

In some embodiments of the aforementioned method, the second game rules and the first game rules are the same. In some embodiments, the second criteria differ from the first criteria and the second game rules differ from the first game rules.

In some embodiments of the aforementioned method, the second criteria comprises the first criteria and a side wager criteria, the side wager criteria being satisfied upon the plurality of gaming symbols randomly generated including one or more preset gaming symbols.

DETAILED DESCRIPTION OF SOME EMBODIMENTS OF THE INVENTION

The invention includes systems and methods for providing, conducting and facilitating play of multiple wagering games at an electronic platform through the use of randomly generated game play data received from one or more live wagering games. It is contemplated that the multiple wagering games may possess characteristics, such as the wagering opportunities and/or game rules, which differ from the characteristics of the live wagering games.

The invention may be applied to any live table game, such as baccarat, blackjack, roulette, craps, pai gow, sic bo, bingo, card games, or any other type of game having a live or electronic dealer and one or more players seated at a gaming table or electronic gaming platform.

As discussed herein, the invention may also be applied in a live table system that monitors a live table game in which physical or virtual cards are dealt to one or more players at a gaming table, or other gaming elements are employed such as dice, and collects the randomly generated game play data.

The game play data collected is used to enable play of the same live table game remotely through gaming terminals. The gaming terminals may be any platform capable of receiving and transmitting data, including "thin-client" platforms or platforms which do not process game play data and "smart" platforms or platforms which process game play data. The gaming terminal maybe stationary, similar to the slot machines or electronic tables commonly seen at the physical casino, or maybe portable electronic devices such as smart phones, computer tablets, portable media players, laptop computers, desktop computers, smart TV, and the like. Additionally, the gaming network they attach to can be of wired (Ethernet, Token Ring, Serial multidrop, etc.) or wireless variety (802.11x, BlueTooth, LTE, 2G/3G/4G cellular, Zigbee, Ultra Wide Band, etc.) known in the art. Thus, players interested in placing wagers on a live-table game are not confined to the gaming table or even the casino floor.

Figure 1:
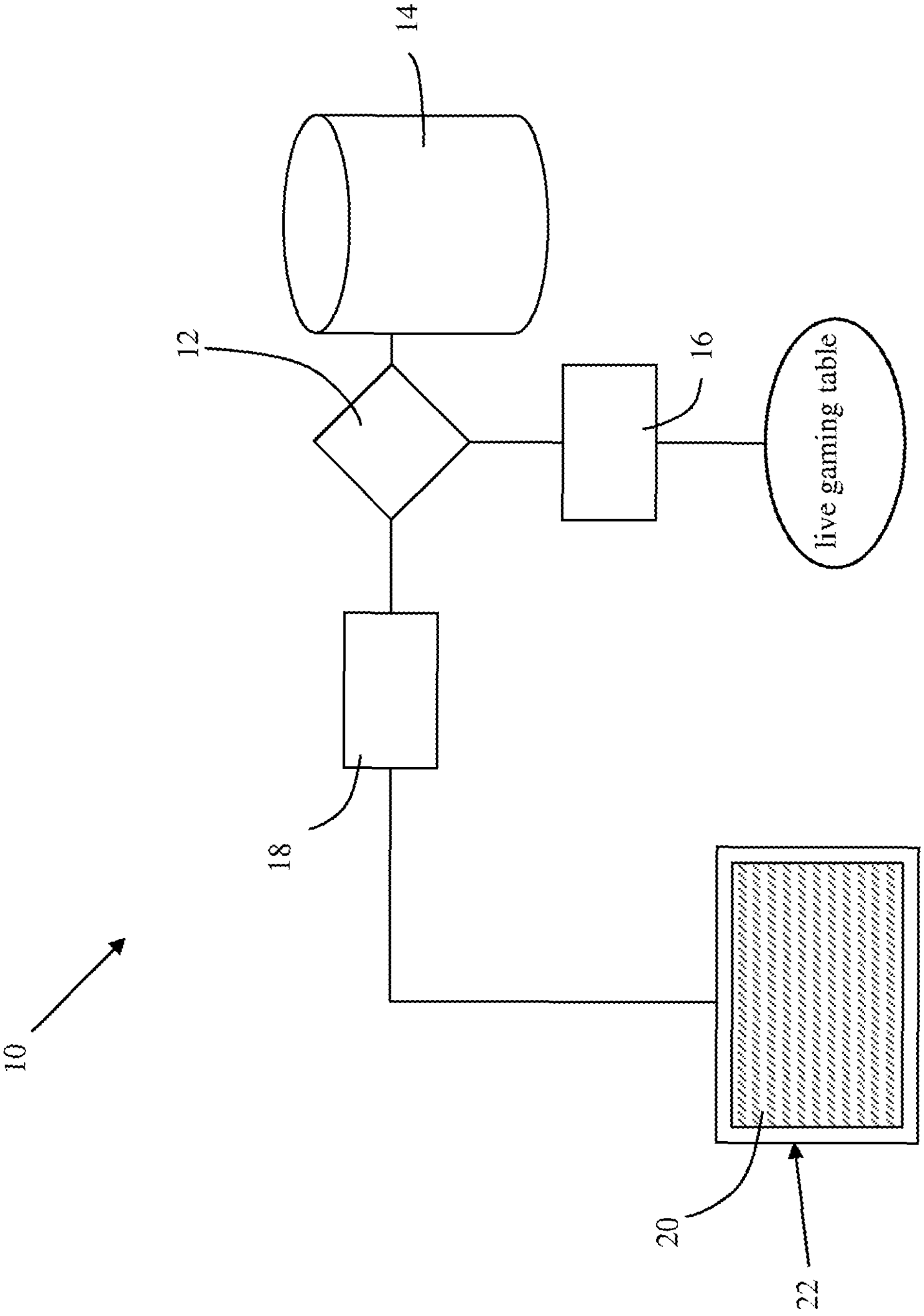
FIG. 1 is a schematic diagram of a system according to some embodiments of the invention.

Referring to FIG. 1, a system 10 for implementing some embodiments of the invention include a processing device 12, a data storage device 14, data input/output devices referred to as "data communication devices" 16 and 18, and a display device 20, some or all of which may be either included in, or in communication with, a remote gaming terminal. For purposes of illustrating some of the embodiments of the invention, data communication device 18 and display device 20 are components of a gaming terminal 22.

The remote gaming terminal may be provided as a kiosk, an interface at an electronic gaming device, a handheld device, cellular phone, or other device networked (locally or via the Internet, for example) to system 10. Data communication device 16 may be positioned at a gaming table and configured for receiving game play data randomly generated during play of the live table game, either through manual input or automatic input of game play information, such as the gaming symbols on the cards dealt, to communication device 16.

For example, game play information may be manually input to data communication device 16 through a manual input device such as a keypad or touchscreen. Alternatively, electronic scanning, recognition and detecting devices known in the art may be used to read cards, determine the location of a roulette ball, or ascertain the results of a dice game, and then automatically transmit the information via communication device 16. Game play information may also be automatically input using a camera mounted over the live table game to obtain game information, or through one or more card reading devices, such as an optical reader mounted in a gaming table, card delivery shoe, or card shuffler, which is capable of decoding the gaming symbols shown on physical playing cards.

Alternatively, in electronic gaming platforms in which physical cards are replaced by virtual cards, the gaming data may derive from the random number generator used to generate random virtual cards.

Data communication device 16 receives and transmits game play data which is randomly generated as a result of playing the live table game. Processing device 12 facilitates comparing the game play data with the rules and/or criteria for winning the wagers stored in data storage device 14, and determining an outcome of the wagers placed on the live table game via data communication device 18 of gaming terminal 22. If the criteria are satisfied, then the wager is won, whereas if the criteria are not satisfied the wager is lost. Display device 20 of gaming terminal 22 is configured to facilitate the entry of wagers, show a live multimedia feed of the table game being played and communicate the outcome of any wagers placed.

System 10 is also configured to provide remote wagering games at gaming terminal 22. The remote wagering games have common features with at least one live table game that permit the game play data, specifically, the randomly generated gaming symbols, which are received as a result of playing the live table game, to be used by processing device 12 for resolving the remote wagering games according to the respective rules and/or criteria associated with the remote wagering games stored in data storage device 14.

System 10 is therefore configured for communicating the remote wagering games via gaming terminal 22 which may advantageously played in addition to or instead of the live table games, even though the remote wagering games may have different wagers, different rules, or both, provided that the amount of gaming symbols necessary to resolve wagers in the remote wagering game are generated as a result of playing the live table games.

For example, system 10 may be configured to provide the option for a player to enter into a live conventional blackjack game through gaming terminal 22. A player using gaming terminal 22 may choose to participate in the live blackjack game or play a remote Blackjack game in which the rules are different, such as the rules for dealing cards to reveal their value, or rules relating to the wager size (minimum, maximum, increment), or rules relating to payout associated with game symbols and symbol combinations, or rules allowing for a wild card, or in a blackjack variant in which the rules differ in any way from conventional blackjack. The cards dealt in the live game are correlated by system 10 with the cards to be received in the remote wagering game according to its rules in order to resolve all wagers placed in the remote wagering game.

System 10 may be configured to be responsive to an additional request for randomly generated game play data which may be necessary for resolving a remote wagering game. For example, system 10 may inform the dealer at the live table game through communication device 16 to continue to deal a certain number of randomly shuffled cards above the amount needed to resolve the live table game, or system 10 may be in communication with a random number generator for the purpose of generating any amount of random gaming symbols necessary to match the amount necessary in the remote wagering game or add on to the random gaming symbols acquired from the live table game.

In another example, system 10 is configured to provide the option for a player to enter into a live conventional blackjack or play a remote blackjack game which includes one or more side wagers. Players may place the side wager through player terminal 22. The randomly generated gaming symbols received via communication device 18 will be compared via processing device 12 with criteria for determining the outcome of the side wager stored in data storage 14. If the requisite gaming symbols have been received then the criteria will be satisfied and the side wager will be won.

For example, a remote blackjack game may allow for the player to wager on receiving a hand that has achieved a poker rank such as a pair. The randomly generated gaming symbols dealt in the live conventional Blackjack game are received and compared with the criteria that the gaming symbols corresponding to the player's hand in the remote blackjack game comprise two cards of the same rank.

In yet another example, the game of baccarat may be played live and broadcast to player terminal 22, along with various remote baccarat variant games that include different rules, such as no-commission versions, variations on pay tables, or which include additional side wagers, which may include progressive side wagers, mystery jackpots or bonuses. Thus, players at gaming terminal 22 are capable of participating in many variations of baccarat games with the same hand delivered in the live table game.

Players may therefore have a variety of options to play other wagering games than the live table game. However, system 10 may be configured so that only the remote wagering games that rely on the same amount or plurality of gaming symbols, or game variations that belong to the same game families (variations of Baccarat, Roulette, Sic-Bo, and the like) as those gaming symbols which are randomly generated in the live table game are offered as available to players through gaming terminal 22.

System 10 may be configured to provide a simulation of the remote wagering game wager on by players using gaming terminal 22. The simulation may be presented on display device 20 according to the rules of the remote wagering game and may take any form, such as a display of playing cards being dealt by a virtual dealer or the actual dealer in the live table game, which would enhance the overall player experience. System 10 may be configured to provide a new display or skin on display device 20 of gaming terminal 22 and provide customized playing cards for the remote wagering games to distinguish between games and provide proprietary information, among other things. Variations in game rules, wager size and pay tables affecting payout amounts and volatility that are different from that of the live table may also be applied to the games at the remote game terminals to provide a favorable personalized player experience.

Figure 2:
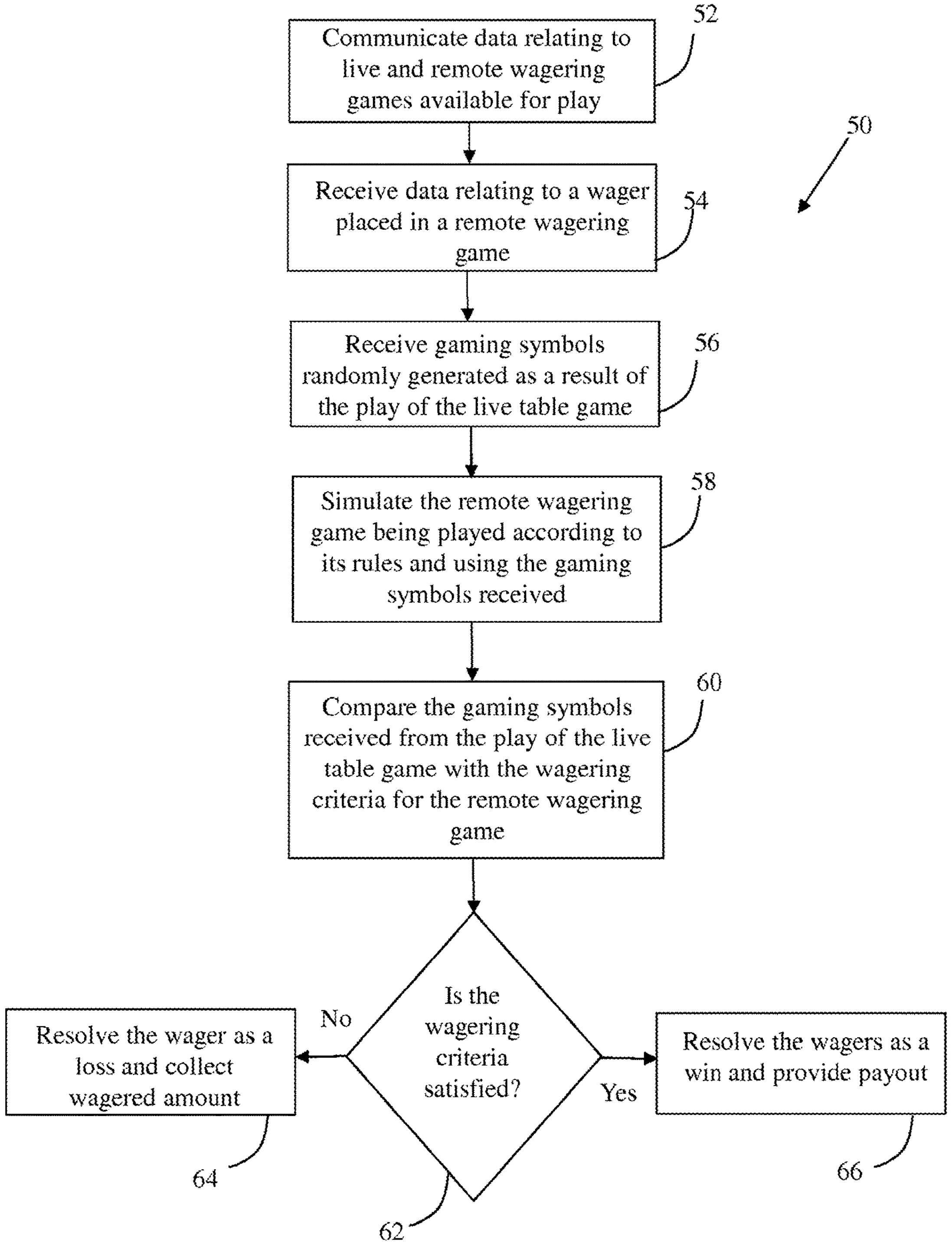
FIG. 2 is a flowchart of a method according to an embodiment of the present invention.

An exemplary method of operating the invention with a system such as system 10 is general referred to by the numeral 50 in FIG. 2.

As shown by step 52, system 10 communicates data relating to one or more live wagering games available for play and the corresponding remote wagering games available for remote play. The corresponding remote wagering games include game rules that may differ from the game rules of the live table game, but the outcome of wagers placed in the remote wagering games are determinable by comparing a wagering criteria for the remote wagering games, which may differ from the wagering criteria for the live table game, with the same gaming symbols randomly generated as a result of playing the live table game.

As shown by step 54, system 10 receives data relating to one or more wagers placed in connection with a remote wagering game. As discussed above, the data may be received via data communication device 18 in gaming terminal 22.

In step 56, system 10 receives gaming symbols randomly generated as a result of the play of the live table game corresponding to the remote wagering game in which wagers are placed in step 54. The gaming symbols may be received via data communication device 16 through any means which is likely to maintain the integrity of the wagering game.

Upon receiving the gaming symbols in step 56, system 10 may actuate a simulation of the remote wagering game being played via display device 20 of gaming terminal 22, as shown by step 58, with the simulation being conducted according to the rules of the remote wagering game. If all gaming symbols have been previously received then in some embodiments players may select to bypass the simulation.

As shown by step 60, system 10 compares the gaming symbols received from the play of the live table game with the wagering criteria for the remote wagering game to determine the outcome of any wagers placed. If the wagering criteria are not satisfied in step 62 then the wager is collected as a loss in step 64. If the wagering criteria are satisfied then the wager is a win and a payout is awarded in step 66. The payout may be awarded through gaming terminal 22 as cash or credit added to an account.

It should be understood that systems such as those described herein may be adapted and configured to function independently or may also interact with other systems or applications, such as for example, a casino management system or player tracking system. As such, the wagering data may be recorded and stored in connection with player information retrieved from the terminal.

Those skilled in the art will readily appreciate that any of the systems and methods of the invention may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as an existing electronic gaming machine, portable computing device or electronic platforms with multiple player positions. In addition, the system of the invention may be provided at least in part on a personal computing device, such as home computer, laptop or mobile computing device through an online communication connection or connection with the Internet. Those skilled in the art will further appreciate that the precise types of software and hardware used are not vital to the full implementation of the methods of the invention so long as players and operators thereof are provided with useful access thereto or the opportunity to play the game as described herein.

It should be readily apparent that additional computerized or manual systems may also be employed in accordance with the invention in order to achieve its full implementation as a system, apparatus or method.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth herein, and in the accompanying patents and patent applications, which disclose, systems, methods and features, all of which may be employed with the invention described herein.

The invention is claimed as follows:

1. A gaming terminal comprising:

a display device;

a processor; and a memory device which stores a plurality of instructions, which when executed by the processor, cause the processor to:

receive data associated with a play of a first game occurring at a gaming table, wherein an outcome of the first game is based on a randomly determined game component associated with the gaming table, and any award associated with the determined outcome of the first game is based on a first paytable associated with the first game, and for a play of a second game:

determine an outcome of the second game, said outcome being based on the randomly determined game component associated with the gaming table, cause the display device to display the determined outcome of the second game, determine any award associated with the determined outcome of the second game, said determination being based on a second paytable associated with the second game, said second paytable being different than the first paytable, and cause the display device to display any determined award associated with the determined outcome of the second game.

2. The gaming terminal of claim 1, wherein the play of the first game is associated with at least one of: a first wager amount, a first minimum wager amount, a first maximum wager amount, a first side bet amount, a first progressive award amount, and a first bonus award amount.

3. The gaming terminal of claim 2, wherein the play of the second game is associated with at least one of: a second, different wager amount, a second, different minimum wager amount, a second, different maximum wager amount, a second, different side bet amount, a second, different progressive award amount, and a second, different bonus award amount.

4. The gaming terminal of claim 1, wherein when executed by the processor, the plurality of instructions cause the processor to cause the display device to display a simulation of the randomly determined game component associated with the gaming table.

5. The gaming terminal of claim 1, wherein the outcome of the first game is based on a plurality of randomly determined game components associated with the gaming table, the outcome of the second game is based on at least one of the randomly determined game components associated with the gaming table.

6. The gaming terminal of claim 1, wherein the display device comprises a display device of a portable electronic device.

7. The gaming terminal of claim 1, wherein the randomly determined game component associated with the gaming table comprises a physical game component selected from the group consisting of: a playing card, a roulette ball, a chip, and a die.

8. A gaming terminal comprising:

a display device;

a processor; and a memory device which stores a plurality of instructions, which when executed by the processor, cause the processor to:

receive data associated with a play of a first game occurring at a gaming table, wherein an outcome of the first game is based on a first randomly determined game component associated with the gaming table, and for a play of a second game:

determine an outcome of the second game, said outcome being based on a second randomly determined game component associated with the gaming table, wherein the outcome of the first game is not based on the second randomly determined game outcome associated with the gaming table, cause the display device to display the determined outcome of the second game, determine any award associated with the determined outcome of the second game, and cause the display device to display any determined award associated with the determined outcome of the second game.

9. The gaming terminal of claim 8, wherein the outcome of the second game is based on the first randomly determined game component associated with the gaming table.

10. The gaming terminal of claim 8, wherein the outcome of the first game is based on a plurality of first randomly determined game components associated with the gaming table and the outcome of the second game is based on a plurality of second randomly determined game components associated with the gaming table.

11. The gaming terminal of claim 8, wherein the play of the first game is associated with at least one of: a first paytable, a first wager amount, a first minimum wager amount, a first maximum wager amount, a first side bet amount, a first progressive award amount, and a first bonus award amount.

12. The gaming terminal of claim 11, wherein the play of the second game is associated with at least one of: a second, different paytable, a second, different wager amount, a second, different minimum wager amount, a second, different maximum wager amount, a second, different side bet amount, a second, different progressive award amount, and a second, different bonus award amount.

13. The gaming terminal of claim 8, wherein when executed by the processor, the plurality of instructions cause the processor to cause the display device to display a simulation of the second randomly determined game component associated with the gaming table.

14. The gaming terminal of claim 8, wherein the display device comprises a display device of a portable electronic device.

15. The gaming terminal of claim 8, wherein at least one of the first randomly determined game component associated with the gaming table and the second randomly determined game component associated with the gaming table comprises a physical game component selected from the group consisting of: a playing card, a roulette ball, a chip, and a die.

16. A method of operating a gaming terminal, said method comprising:

receiving data associated with a play of a first game occurring at a gaming table, wherein an outcome of the first game is based on a randomly determined game component associated with the gaming table, and any award associated with the determined outcome of the first game is based on a first paytable associated with the first game, and for a play of a second game:

determining, by a processor, an outcome of the second game, said outcome being based on the randomly determined game component associated with the gaming table, causing a display device to display the determined outcome of the second game, determining, by the processor, any award associated with the determined outcome of the second game, said determination being based on a second paytable associated with the second game, said second paytable being different than the first paytable, and causing the display device to display any determined award associated with the determined outcome of the second game.

17. The method of claim 16, wherein the play of the first game is associated with at least one of: a first wager amount, a first minimum wager amount, a first maximum wager amount, a first side bet amount, a first progressive award amount, and a first bonus award amount.

18. The method of claim 17, wherein the play of the second game is associated with at least one of: a second, different wager amount, a second, different minimum wager amount, a second, different maximum wager amount, a second, different side bet amount, a second, different progressive award amount, and a second, different bonus award amount.

19. The method of claim 16, further comprising causing the display device to display a simulation of the randomly determined game component associated with the gaming table.

20. The method of claim 16, wherein the outcome of the first game is based on a plurality of randomly determined game components associated with the gaming table, the outcome of the second game is based on at least one of the randomly determined game components associated with the gaming table.

21. The method of claim 16, wherein the randomly determined game component associated with the gaming table comprises a physical game component selected from the group consisting of: a playing card, a roulette ball, a chip, and a die.

22. The method of claim 16, which is provided through a data network.

23. The method of claim 22, wherein the data network is an internet.

24. A method of operating a gaming terminal, said method comprising:

receiving data associated with a play of a first game occurring at a gaming table, wherein an outcome of the first game is based on a first randomly determined game component associated with the gaming table, and for a play of a second game:

determining, by a processor, an outcome of the second game, said outcome being based on a second randomly determined game component associated with the gaming table, wherein the outcome of the first game is not based on the second randomly determined game outcome associated with the gaming table, causing a display device to display the determined outcome of the second game, determining, by the processor, any award associated with the determined outcome of the second game, and causing the display device to display any determined award associated with the determined outcome of the second game.

25. The method of claim 24, wherein the outcome of the second game is based on the first randomly determined game component associated with the gaming table.

26. The method of claim 24, wherein the outcome of the first game is based on a plurality of first randomly determined game components associated with the gaming table and the outcome of the second game is based on a plurality of second randomly determined game components associated with the gaming table.

27. The method of claim 24, wherein the play of the first game is associated with at least one of: a first paytable, a first wager amount, a first minimum wager amount, a first maximum wager amount, a first side bet amount, a first progressive award amount, and a first bonus award amount.

28. The method of claim 27, wherein the play of the second game is associated with at least one of: a second, different paytable, a second, different wager amount, a second, different minimum wager amount, a second, different maximum wager amount, a second, different side bet amount, a second, different progressive award amount, and a second, different bonus award amount.

29. The method of claim 24, further comprising causing the display device to display a simulation of the second randomly determined game component associated with the gaming table.

30. The method of claim 24, wherein at least one of the first randomly determined game component associated with the gaming table and the second randomly determined game component associated with the gaming table comprises a physical game component selected from the group consisting of: a playing card, a roulette ball, a chip, and a die.

31. The method of claim 24, which is provided through a data network.

32. The method of claim 31, wherein the data network is an internet.

* * * * *